United States Patent [19]

Gerstenfeld et al.

[11] Patent Number: 4,949,267
[45] Date of Patent: Aug. 14, 1990

[54] SITE-SELECTABLE AIR TRAFFIC CONTROL SYSTEM

[75] Inventors: Arthur Gerstenfeld, Newton; Michael N. Gualtieri, Boxford; Thomas D. Moody, North Reading, all of Mass.

[73] Assignee: UFA, Inc., Newton, Mass.

[21] Appl. No.: 233,037

[22] Filed: Aug. 17, 1988

Related U.S. Application Data

[63] Continuation-in-part of Ser. No. 176,639, Apr. 1, 1988, which is a continuation-in-part of Ser. No. 931,867, Nov. 18, 1986, Pat. No. 4,827,418.

[51] Int. Cl.$^5$ ............................................. G06F 15/48
[52] U.S. Cl. .................................... 364/439; 364/578
[58] Field of Search ............... 364/200, 900, 300, 513, 364/578, 439

[56] References Cited

U.S. PATENT DOCUMENTS

| | | | |
|---|---|---|---|
| 3,330,944 | 7/1967 | Inderhees | 364/439 |
| 3,668,403 | 6/1972 | Meilander | 342/36 |
| 3,775,767 | 11/1973 | Fielding | 364/439 |
| 4,063,037 | 12/1977 | Strayer | 364/439 |
| 4,104,512 | 8/1978 | Strayer | 364/439 |
| 4,649,388 | 3/1987 | Atlas | 342/26 |
| 4,706,198 | 11/1987 | Thurman | 364/439 |
| 4,766,555 | 8/1988 | Bennett | 364/518 |
| 4,827,418 | 5/1989 | Gerstenfeld | 364/439 |

OTHER PUBLICATIONS

Szymanski, "Jetset," Nov. 1982, Byte, pp. 272–299.
Microsoft Flight Simulator Manual, approx. 1985, pp. 73–76, 92–95 and 117–132.
Sublogic Flight Simulator Advertisement from 9/87 "Family Computing".
Andriole, "Applications in Artificial Intelligence," 9/1985, pp. 501–503.
Steeb, "Distributed Intelligence for Air Fleet Control," abstract, 1981, Rand Corp, Interium Report.
Chrisley, "Air Traffic Controller Aids for Planning of Arrival Traffic An AI Approach," abstract, Aug. 87.
Cross, "Computer Understanding of Air Traffic Control Displays," abs. IEEE Transactions on Systems, 1/85, Man and Cybernetics pp. 133–135.
Niedringhaus, "Automated Enroute Air Traffic Control Algorithmic Specifications," abstract, Federal Aviation Administration, 1983.
Hayes-Roth, "The Knowledge-Based Expert System: A Tutorial," 9/84, 9/84, pp. 11–28, Computer, vol. 17 #9.
Hartzband, "Enhancing Knowledge Representation in Engineering Databases," 9/85, pp. 39–48, Computer.
Tobias, "Time-Based Air Traffic Management Using Expert Systems," Aerodynamics abstracts, p. 2988, 4/86.
Findler, "Air Traffic Control: A Challenge for Artificial Intelligence" 1/87, pp. 59–66, AI Expert.

*Primary Examiner*—Thomas G. Black
*Attorney, Agent, or Firm*—Joseph S. Iandiorio

[57] ABSTRACT

A site-selectable air traffic control system and method for interacting with a user, the system and method generating a representation of at least one moving aircraft having an initial position and heading with respect to a selected site for producing a dynamic simulation of an air traffic scenario. The site selected may consist of one of a plurality of stored sites or a modification of one of those sites. Controller commands issued by a user are entered for altering the air traffic scenario. Rules and procedures stored in a general knowledge base and a site-specific knowledge base are compared to the present state of the simulation of the air traffic scenario or to the controller command by an expert system for issuing a warning upon the immediate or foreseeable failure to observe any rule or procedure in the knowledge bases.

26 Claims, 13 Drawing Sheets

SITE-SELECTABLE AIR TRAFFIC CONTROL SYSTEM

RELATED APPLICATION

This application is a continuation-in-part of U.S. patent application Ser. No. 176,639, filed Apr. 1, 1988, entitled "Air Traffic Control Training System", which is a continuation-in-part of U.S. Pat. Ser. No. 931,867 now U.S. Pat. No. 4,827,418 filed Nov. 18, 1986, entitled "Expert System for Air Traffic Control and Controller Training".

FIELD OF INVENTION

This invention relates to a multisite air traffic control system and, more particularly, to a system that simulates dynamic air traffic scenarios at a site selected by a user and automatically provides instructional feedback to the user.

BACKGROUND OF INVENTION

At the present time, it requires four or five years to train air traffic controllers. The bulk of this time is spent on the job under the supervision of instructors. The length of time required for on-the-job training is primarily attributed to the limited number of available air traffic controllers at a particular site that can spend the proper amount of time to tutor students on a variety of different conditions. The controllers must teach students to be responsible for controlling all aircraft located in their radar sector, which defines a geographic region. Aircraft which fly from one sector to another must be properly transferred from the control of one controller to another. This is known as a handoff, and it is the responsibility of the separate controllers to resolve potential problems. Thus teamwork is an important aspect of the training.

Students must also be taught to monitor dozens of arriving and departing flights under numerous types of traffic and weather conditions. Trainees must learn to keep track of each aircraft's heading, altitude, and speed, while anticipating each aircraft's future flight path to sequence clearances intelligently and to avoid rule violations and collisions. In addition, there are numerous rules and procedures, such as site-specific letters of agreements and standard operating procedures, which must be learned to ensure traffic safety. Consideration must also be given to safe and timely departures and arrivals, fuel economy, and noise pollution.

In an attempt to reduce the on-the-job training time of air traffic controllers and improve the one-to-one student/instructor ratio, off-the-job training facilities have been established. These facilities are equipped with essentially the same radar equipment as that used by experienced controllers, which requires them to be linked to a main computer at a local airport or en route center. This equipment includes a radar screen which displays the geographical map of that particular site. This map typically consists of a film or slide which has been specially engraved for displaying geographic boundaries of the airport and runways, as well as natural boundaries such as mountains or bodies of water, on the radar screen. Navigational aids such as navigational markers and visual omnirange locations are also commonly displayed by the map. One of the problems facing these facilities is that this radar equipment is extremely expensive, so availability is often limited. There is also a temptation to use this training equipment for actual air traffic control when the equipment used by air traffic controllers breaks down. Another concern is that students may be trained on equipment that may soon become obsolete.

Off-the-job practice sessions at these facilities typically include simple air traffic scenarios generated on the students, radar display. These scenarios are stored in the main computer and usually involve complex programs which take into account the particular geographical features of, and site-specific rules and procedures for that airport or en route center. Access to these programs is often interrupted during times when air traffic is heavy, because students are directly competing with experienced controllers for computer time. Another limitation of these facilities is that they are limited to teaching the students rules for that particular site only. Reasons for limiting training to that particular site include the expense of obtaining a new map and extensive reprogramming of scenarios for that new site. Problems also occur when there are changes in navigational aids for a particular site. In other words, the present training facilities do not have the capacity for training students for different sites or for retraining controllers before they are transferred to new sites.

Typically, the traffic scenarios stored on the main computer allow students to practice giving clearances to aircraft projected on their radar displays by verbally communicating with another person acting as a pseudopilot. The pseudopilot in each case responds to the verbal commands or clearances of a student controller by entering the commands into the computer by way of a keyboard. The pseudopilot then verbally acknowledges the student controller in a manner that is similar to a pilot's response. In complex situations, two pseudopilots may be necessary to respond to the rapid verbal commands of a single student controller. During a different learning session, the roles of the student controllers and the pseudopilots are interchanged. In learning sessions without an instructor present, students are generally limited by their current knowledge of the numerous rules and procedures.

SUMMARY OF INVENTION

It is therefore an object of this invention to provide an automated site-selectable air traffic control training system which interacts with a user to simulate air traffic scenarios at a selected site (en route or terminal) while providing expert instruction to the user.

It is a further object of this invention to provide such a system which interacts with a user for teaching the responsibilities of managing one or more aircraft at the selected site.

It is a further object of this invention to provide such a system for producing a dynamic simulation of an air traffic scenario that can be varied for teaching different safety procedures at the selected site.

It is a further object of this invention to provide such a system that simulates the mapped site used on equipment currently being used by air traffic controllers.

It is a further object of this invention to provide a system which operates independently of the actual equipment used by air traffic controllers, thereby making that equipment available full-time for actual air traffic control.

It is a further object of this invention to provide such a system which provides different levels of training exercises for each selected site.

It is further an object of this invention to provide such a system that accelerates the air traffic control training program.

It is further an object of this invention to provide such a system which reduces on-the-job training for a particular site.

It is a further object of this invention to provide such a system that allows a controller to be retrained for other sites.

It is a further object of this invention to provide such a system that allows a specific site to be built and easily modified.

It is a further object of this invention to provide such a system that allows a specific site to be easily modified.

It is a further object of this invention to provide a network system that interconnects several air traffic control training systems to enable a number of users to interact for developing a teamwork environment between the users.

It is a further object of this invention to provide such a network system that allows an instructor to supervise multiple users.

It is a further object of this invention to provide a network which enables users to train on different scenarios at different sites simultaneously.

This invention results from the realization that a truly effective automated site-selectable training system for teaching air traffic controller users rules and procedures for different sites can be achieved by generating realistic air traffic scenarios at different sites selected by the users, providing controls to change the flight pattern of one or more aircraft, overseeing the actions of the users, and evaluating their actions to automatically instruct and provide feedback to the users in actual air traffic control rules and procedures at that selected site.

This invention features a site-selectable air traffic control training system which interacts with a user. The system includes means for generating a representation of at least one moving aircraft having an initial position and heading for producing a dynamic simulation of an air traffic scenario at one of a plurality of selectable sites. Means for generating may include a simulated radar display for displaying the dynamic simulation and geographic boundaries associated with the selected site. The training system also includes means for entering a controller command from the user for altering the air traffic scenario. The system further includes a general knowledge base for storing common rules and procedures applicable to air traffic scenarios for the selectable sites and a site-specific knowledge base for storing particular rules and procedures applicable to one or more air traffic scenarios for each of the selectable sites. A comparison module is provided for comparing the rules and procedures stored in the general knowledge base and the site-specific knowledge base to the present state of the simulation of the air traffic scenario or to the controller command and for issuing an alert upon the immediate or foreseeable failure to observe any rule or procedure. The system may also comment on the user's technique, such as excessive separation distance between aircraft. The means for generating may further include a control panel means and instrument means for enabling control of the means for displaying the air traffic scenario and for simulating the controls present in a work environment of the air traffic controller.

The system may further include means for displaying geographical boundaries associated with the selected site, means for displaying the air traffic scenario, clock means for generating time increments to index the generated air traffic scenario, and means for representing the generated time increments within an inset on the means for displaying the scenario. Storage means may be responsive to the means for generating for storing the air traffic scenario and for addressing a selected time increment for replaying the scenario on the means for displaying. The means for generating may further include means for advancing or reversing the air traffic scenario to a predetermined increment of time. Means for generating may also include means for generating and displaying navigational aids associated with a selected site.

In another embodiment, an air traffic control which allows a user to interact with the system includes at least one training unit and a comparison module for comparing rules and procedures stored in a general knowledge base and a site specific knowledge base to the present state of the simulation of the air traffic scenario or to the controller command for issuing a warning upon the immediate or foreseeable failure to observe any rule or procedure in the knowledge bases. The general knowledge base stores common rules and procedures applicable to air traffic scenarios for said plurality of sites. The site-specific knowledge base stores particular rules and procedures applicable to one or more air traffic scenarios for each of the selectable sites. The training unit consists of a means for generating and displaying on a simulated radar display means a representation of at least one moving aircraft having an initial position and heading for producing a dynamic simulation of a selected air traffic scenario. The training unit also includes mapping means for generating and displaying geographical boundaries and navigational aids for each of the selected sites. Means are also provided for displaying the dynamic simulation and for entering a control command from the user for altering the air traffic scenario.

The system may also include a plurality of training units and a supervisor unit, interconnected to the plurality of units by a network bus. The supervisor unit includes means for selectively displaying the air traffic scenario selected at each of said plurality of training units. The supervisor unit may also include means for entering a supervisor command for altering the air traffic scenario displayed on the means for displaying at one or more of the plurality of training units. The site-specific knowledge base may include notices to airmen and the supervisor unit may include means for generating and updating the notices in each of the training units.

The system may also include means for generating an inset on the means for displaying the air traffic scenario for displaying a generated measurement of time that indexes the generated air traffic scenario in time increments. Storage means may be included which are responsive to the clock means for storing the air traffic scenario time increments and further include means for addressing a selected time increment to replay the scenario on the means for displaying. The system also includes the ability to stop or "freeze" the scenario at any particular point during the scenario.

In another embodiment, a selectable site air traffic control training system, which permits a user to interact with the system, includes a training unit, a general knowledge base for storing general rules and procedures for a plurality of sites, a site-specific knowledge base for storing particular rules and procedures applicable to an air traffic scenario for each site selected, and a comparison module which compares rules and procedures to the present state of the simulation of the air traffic scenario or to the controller command, and issues a warning upon the immediate or foreseeable failure to observe any rule or procedure in either knowledge base. The system may also include means for generating a verbal warning and an explanation of the warning in response to the expert system's issuing of a warning upon immediate or foreseeable failure to observe any rule or procedure in the knowledge bases.

In this system, the training unit includes means for generating the representation of at least one moving aircraft having an initial position and heading for producing a dynamic simulation of an air traffic scenario. Means are provided for displaying the dynamic simulation and for entering a controller command from the user for altering the air traffic scenario. The unit further includes means for verbally acknowledging the controller commands in response to means for entering the controller command from the user. The training unit may further include control panel means and instrumentation means for enabling control of the means for displaying and for simulating the controls present in the work environment of an air traffic controller.

DISCLOSURE OF PREFERRED EMBODIMENTS

Other objects, features and advantages will occur from the following description of preferred embodiments and the accompanying drawings, in which.

The invention can be accomplished by providing a site selectable air traffic control system which allows a user to interact with a training unit to change or alter air traffic scenarios at a selected site while providing feedback that would normally be provided by an instructor. While the description of the system refers to teaching a student, the utility of the system extends beyond the classroom. For instance, the system is equally applicable for testing new plans and procedures at a specific site for improving air traffic control. Such tests may include a redistribution of the work load of air traffic controllers, changes in airways or navigational markers, or redistribution of arrival and departure routes.

Figure 1:
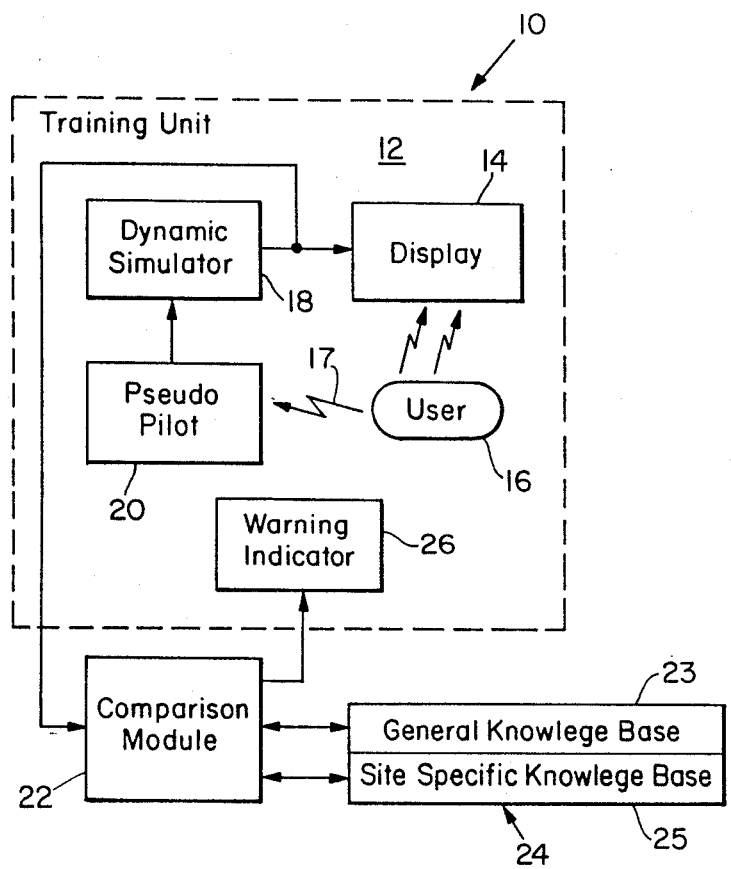
FIG. 1 is a schematic block diagram of a training system according to this invention having a training unit which accesses a knowledge base consisting of a general knowledge base and a site-specific knowledge base.
Figure 1A:
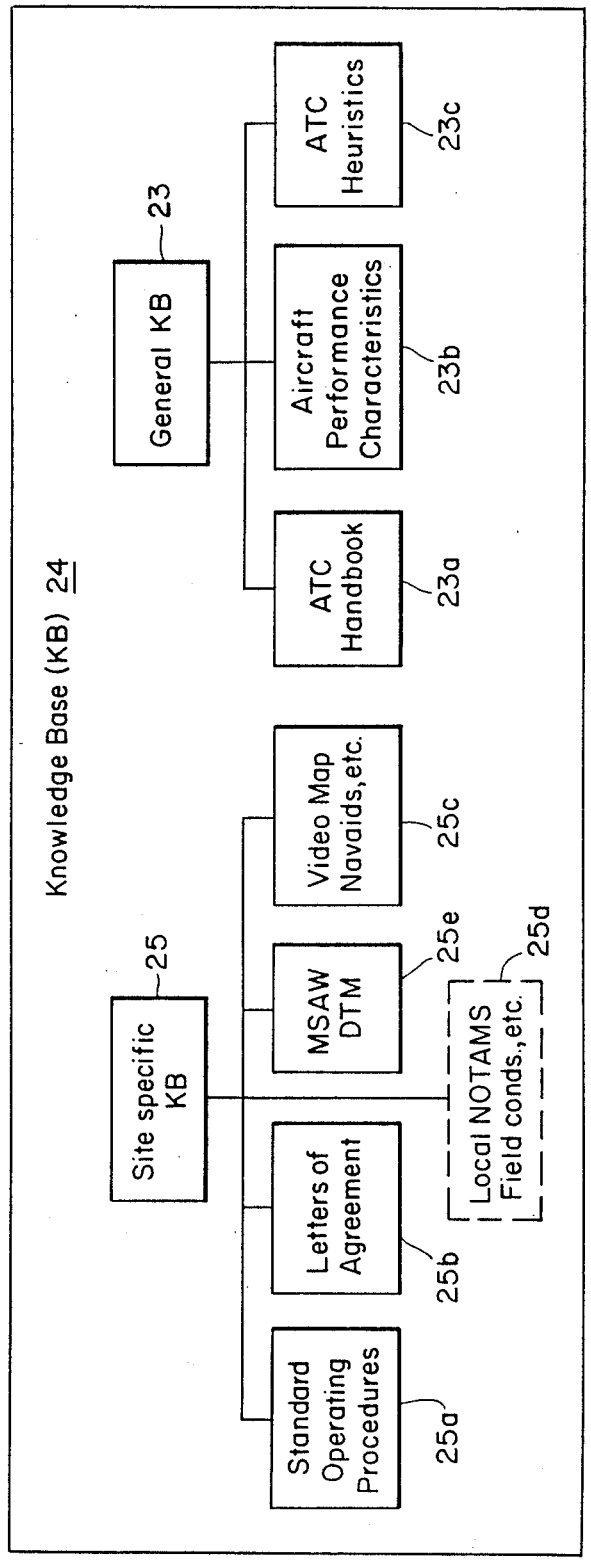
FIG. 1A is a schematic block diagram of the knowledge bases of FIG. 1 including rules and procedures stored in the general knowledge base and the site-specific knowledge base.

Training system 10, shown in FIG. 1, includes training unit 12 having display 14 on which a user 16 observes an air traffic scenario that is generated for a particular site by a dynamic simulator 18. As the scenario develops, user 16 issues verbal commands 17 to another person who acts as a pseudopilot 20 for feeding information into dynamic simulator 18, which alters the scenario according to the user's command. Information is entered by the pseudopilot by a keyboard, a touch screen, or a combination of both. A comparison module 22 constantly monitors the information generated by dynamic simulator 18 for comparing the present state of the scenario to determine if a rule or procedure, stored in a knowledge base 24, is violated. Knowledge base 24 consists of a general knowledge base 23 and a site-specific knowledge base 25. General knowledge base 23 includes general rules and procedures that are applicable to air traffic scenarios for a plurality of sites, and may include *Air Traffic Control Handbook* rules 23a, Aircraft Performance Characteristics 23b, and air traffic control heuristics which include expert techniques 23c for each scenario, as shown in FIG. 1A. Other general rules and procedures regarding sequencing and safety may also be included. Site-specific knowledge base 25 includes rules and procedures for each of the selected sites, and may include standard operating procedures (SOPs) 25a, site-specific letters of agreement 25b (LOAs), navigational aids (NAVAIDs) 25c, notices to airmen (NOTAMs) 25d, and minimum safe altitude warnings(MSAW) 25e. NAVAIDS 25c typically include rules and procedures for instrument landing. Such rules and procedures are associated with navigational markers, such as intersections of visual omniranges, glide paths, or localizers and geographical boundaries and features particular to that site. NOTAMS 25d is transient information which requires frequent updating. NOTAMS 25d include notices such as the present condition of each runway, as well as other pertinent notices, such as a plane having a flat tire on a particular runway.

If a rule or procedure is violated, comparison module 22 issues a warning to a warning indicator 26, which informs user 16 that a rule or procedure has been violated. If poor technique is demonstrated by the user 16, then comparison module 22 would issue advice via warning indicator 26. For example, if separation is too great between aircraft a rule or procedure will not be violated but time and fuel may be wasted. Comparison module 22 would compare the user's control parameters with heuristic techniques for notifying the user of possible improvements. As another example, a recommendation could be made to improve the user's clearance commands to provide a smooth ride for passengers, i.e., avoid unnecessary speed changes, altitude changes, or heading changes. Thus, this system allows a trainee to compare his technique with that of an expert. This process is accomplished by storing the approach taken by an expert for that given scenario and comparing that approach to that of the user. In the preferred embodiment an expert approach is stored for that scenario and may be superimposed on any selected site, in order to save memory space. Comparison module 22 is used to determine if there is a large variation from the expert's approach for that site.

Figure 2:
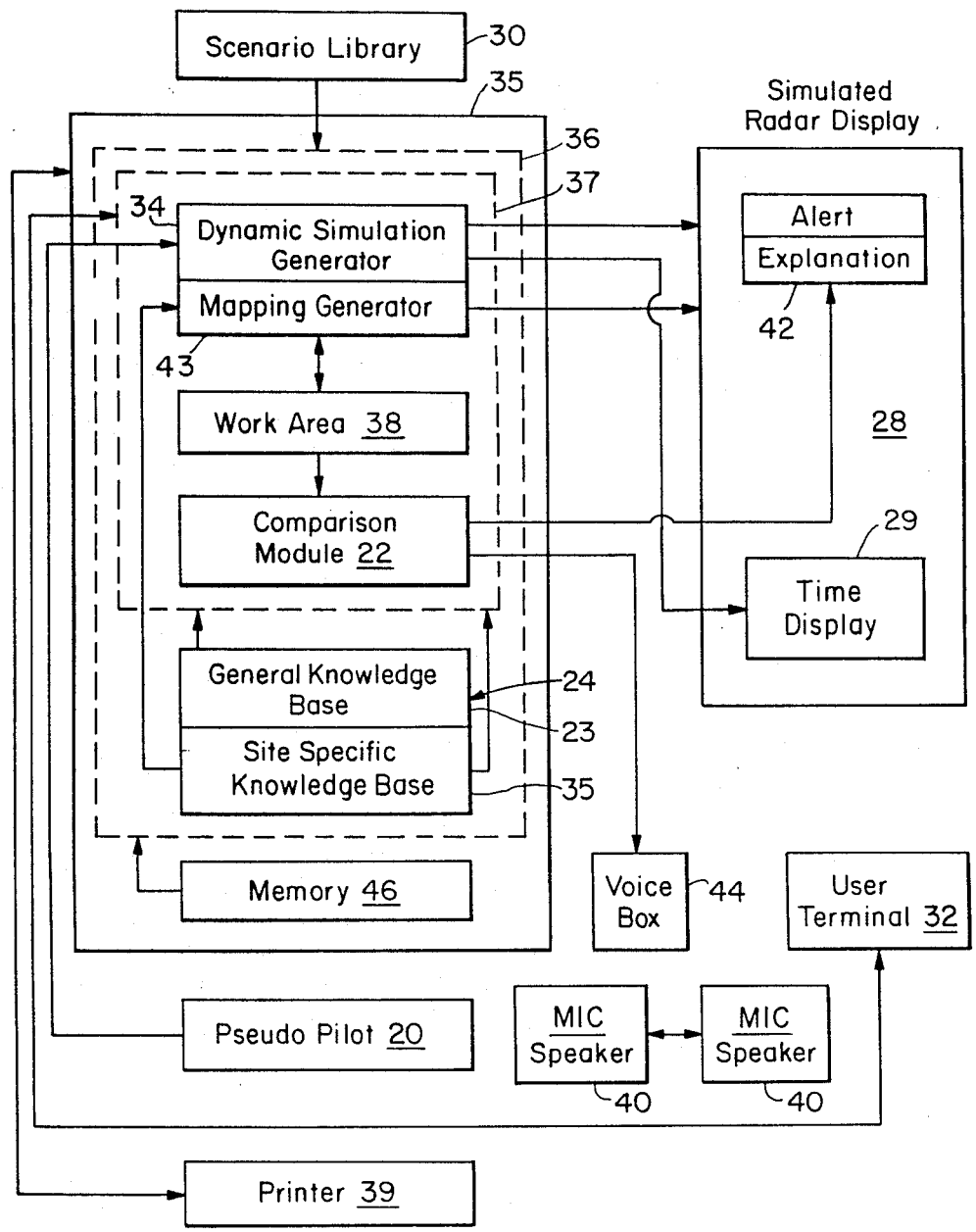
FIG. 2 is a schematic block diagram of the hardware components of the training system according to this invention.

As illustrated in FIG. 2, system 10 includes a simulated radar display 28 for simulating the realtime radar display for a particular site. Display 28 may be generated using a standard piece of hardware 36 having high-resolution graphics, such as an Apollo AI or a DEC MICRO VAX AI workstation.

An air traffic control scenario is selected from a scenario library 30 on a user's terminal 32 placed in front of the simulated radar display. Terminal 32 may be connected to a trackball, shown in FIG. 7, which is used for controlling a cursor, not shown. Preferably pop-up screens are used to list the selections for making a decision. Library 30 stores a variety of training scenarios that are scaled for beginners to experts. Scenarios may include circumstances which may rarely occur. The advantage of providing these types of scenarios is that the user can be trained to handle a variety of complex situations that may not otherwise occur during his on-the-job training. These scenarios may also provide practice for experienced controllers for sharpening their skills.

Once an air traffic scenario is selected, it is fed into an expert system 36 of a CPU 35. Expert system 36 includes an inference engine 37 and a knowledge base 24. Inference engine 37 consists of a dynamic simulation generator 34 for generating the scenario on simulated radar display 28 and a mapping generator 43 for generating the geographical boundaries and features for a selected site. These boundaries and features are preferably stored in site-specific knowledge base 25. A work area 38 which is used to update the scenario shown on display 28. Work area 38, dynamic simulator generator 34, and mapping generator 43 are illustrated as the dynamic simulator 18 of FIG. 1. Comparison module 22, within inference engine 37, calculates the present heading, speed, altitude, etc., for each aircraft before displaying the updated version on display screen 28. The knowledge base 24 is accessed by comparison module 22 in real time or faster than real time as needed. As the scenario develops, the user may react to aircraft shown on display screen 28 by issuing clearance commands for changing the flight pattern of a particular aircraft. These commands are verbally issued over a microphone and a speaker assembly 40, which informs pseudopilot 2 of the desired changes. Pseudopilot 20 enters these changes into dynamic simulation generator 34, which then updates the parameters of the scenario in work area 38. Pseudopilot 20 then acknowledges these changes back to user 16 over a microphone and speaker arrangement 40 for simulating a typical response from an aircraft pilot.

When work area 38 is updated, comparison module 22 compares the present state of the scenario with knowledge base 24 to determine if a rule or procedure is violated or if poor technique is demonstrated. If a violation occurs, comparison module 22 issues a warning to user 16 by generating an instructor's window 42 on simulated radar display 28. The instructor's window 42 consists of an inset on the display which includes an alert message that a rule or procedure is violated and an explanation of the violation. The explanation may include the text of the rule or procedure that was violated, refer to a specific rule, or make recommended courses of action. Alternatively, the comparison module may issue, in conjunction with the instructor's window, a warning over a voicebox 44 which essentially reads the contents displayed in the instructor's window. This allows the user to continually focus his attention on the developing air traffic scenario.

In the preferred embodiment, the entire session is recorded in a memory 46. Clearances issued by the user and warnings issued by comparison module 22 are recorded as they occur. This allows a user or an instructor to later review the session on simulated radar display 28 or on a hard copy provided by a printer 39.

Figure 3:
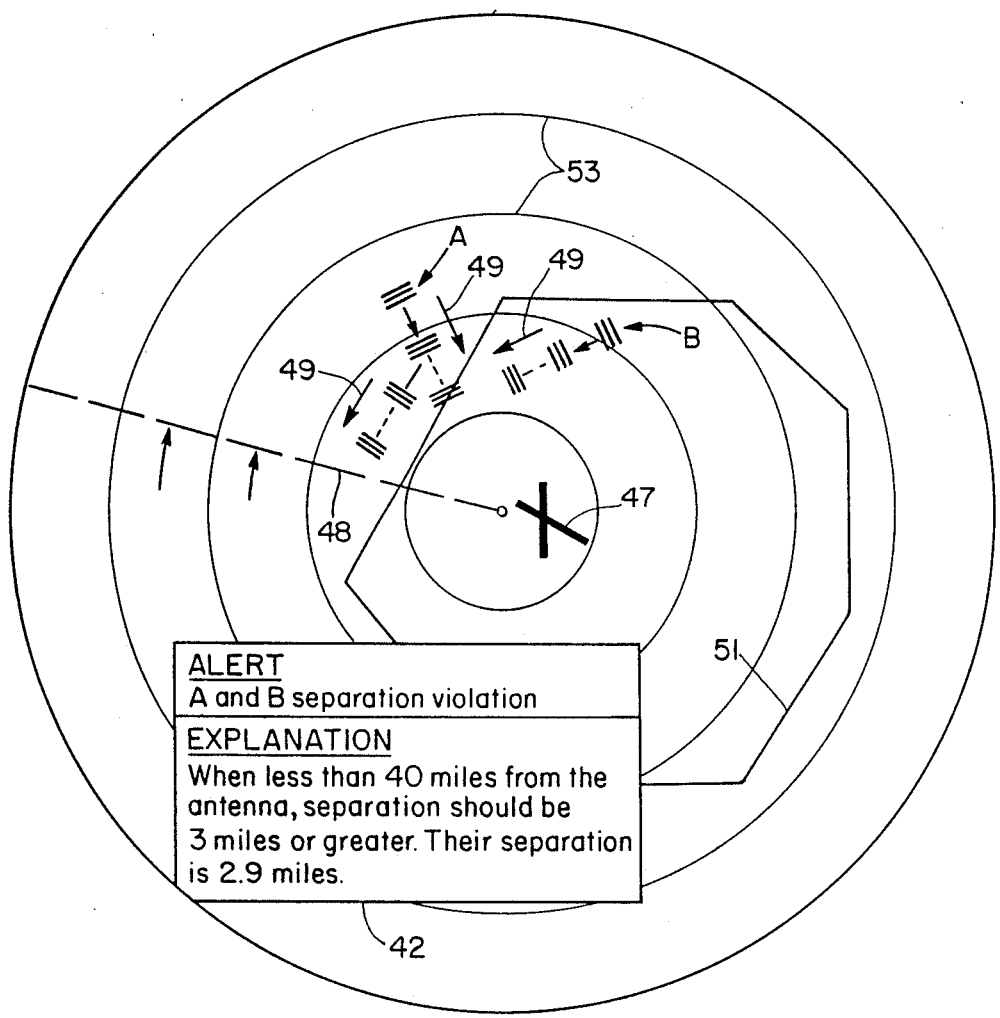
FIG. 3 is an illustration of a radar screen showing the flight pattern of two aircraft at a particular airport terminal.

As a simple illustration, an air traffic scenario for a particular site is shown in FIG. 3. The simulation includes a radar sweep 48 that tracks two aircraft A and B located in different geographical regions of the controller's sector as it passes over that region. Geographical boundaries 51 and navigational marks 53 are also shown. The flight pattern of each aircraft is dynamically controlled by the operator. In other words, once the aircraft becomes visible on the simulated radar screen, it is up to user 16 to control its flight pattern in order to safely land that aircraft on runway 47. Whenever the radar sweep tracks an aircraft, the aircraft's heading and position is updated according to its previous flight pattern or by a recent user clearance command. If the user does nothing, the airplane will continue on its original path as indicated by arrows 49. By issuing a clearance command, the course of the aircraft is changed. This new course for this aircraft will continue at the same heading, speed, altitude, etc., as instructed by the user until such time as another clearance command is issued. As the scenario is updated, comparison module 22 compares the data for the present state of the scenario with the rules, procedures, and a record of the performance of an expert air traffic controller for that air traffic scenario in knowledge base 24 for possible violations. In the preferred embodiment, the alert is a short message that tells the controller that something is wrong, i.e., there is wake turbulence, noise abatement, separation violation, etc. The explanation includes a message that explains why there was a violation by citing the particular rule violated. For this case, expert system 22 generated a warning in instructor's window 42 alerting the user that aircraft A and B violated a separation rule, and cited the rule.

Figure 4:
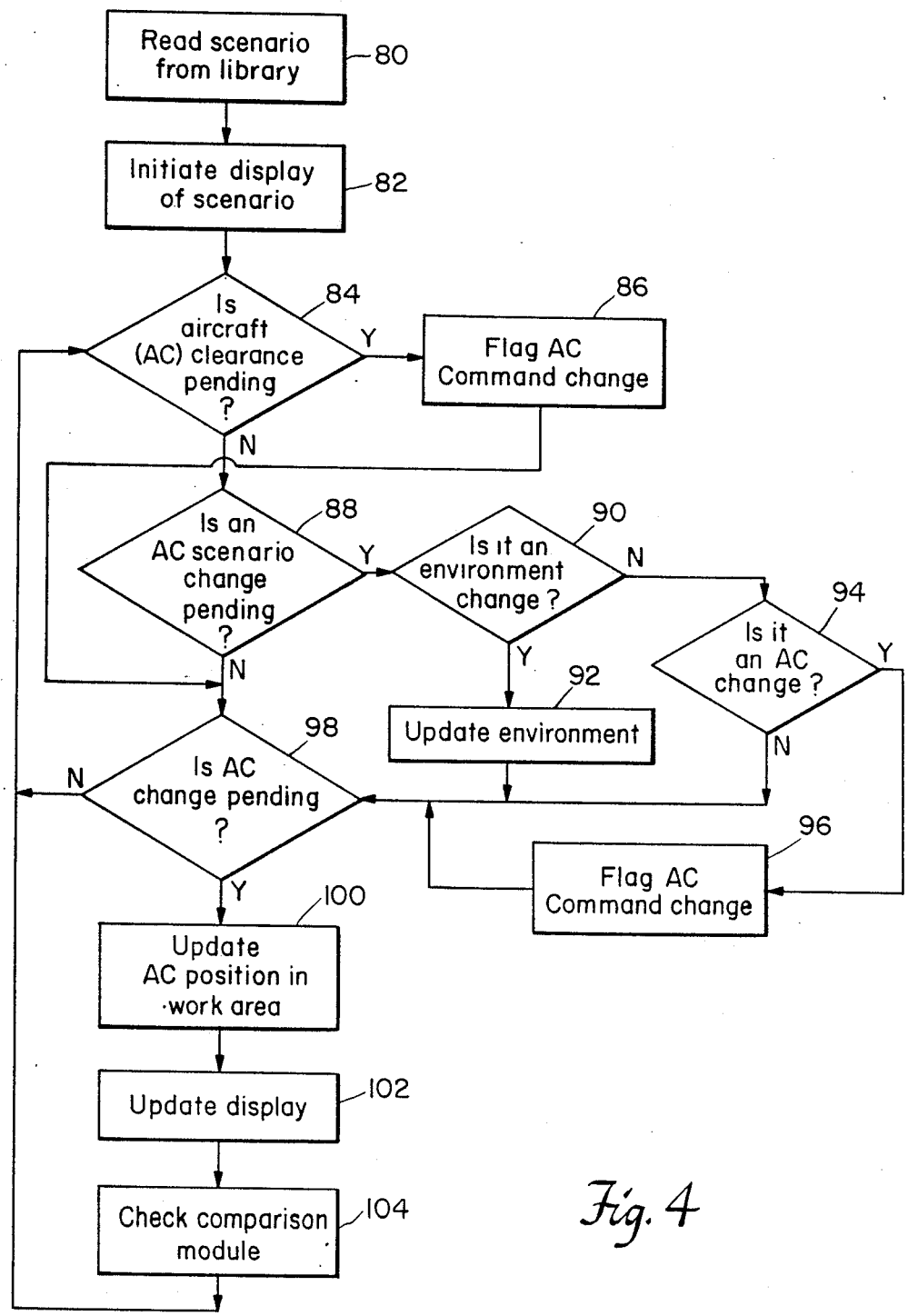
FIG. 4 is a flow diagram illustrating the operation of the simulation generator shown in FIG. 2.

The operation of dynamic simulation generator 34 is illustrated in FIG. 4. After user 16 has chosen a scenario from the scenario library, the scenario is loaded into the simulator generator, step 80, which processes the stored information and initiates the scenario on the simulated radar display screen, step 82. The simulation generator then determines whether a controller clearance is pending for an aircraft tracked by the radar sweep, step 84.

If a command is pending, then generator 34 translates the command into an aircraft change instruction, step 86, which updates the position of the aircraft in the work area, step 100, and simultaneously updates the display, step 102. This update is then checked by comparison module 22 for possible violations before returning to see if another control clearance is pending, step 104.

For cases where there are no controller clearances pending, simulation generator 34 checks to see if there is a scenario change, step 88. If there is a scenario change, the simulation generator determines whether it is an environmental change or an aircraft change, steps 90 and 94. For example, the stored scenario may introduce a weather change or another aircraft onto the radar display. The weather change could be a change in wind, velocity or direction, at different altitudes or a change in precipitation. These pending changes are then translated into instructions for updating the scenario steps 92 and 96. If an aircraft change was pending, the comparison module 22 checks the updated data of the work are of the ggnerator for possible violations, step 104; otherwise the simulator generator returns to determine if a controller clearance is pending for the next aircraft under consideration.

Figure 5:
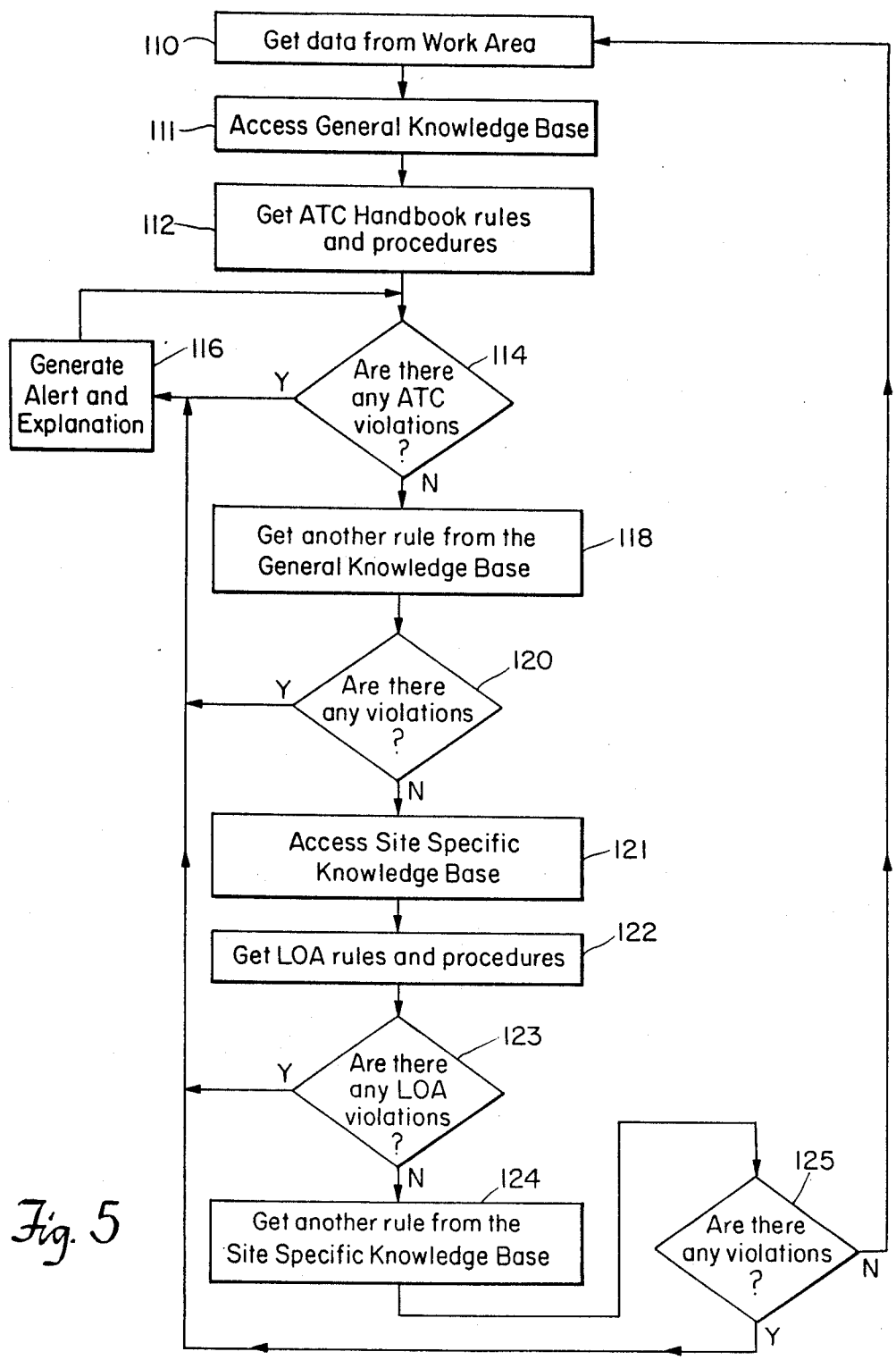
FIG. 5 is a flow diagram illustrating the operation of the comparison module shown in FIG. 2.

As demonstrated by the simulation generator flowchart, a call to the comparison module is initiated whenever an aircraft is updated. Comparison module 22 receives data from the work area of the generator and compares this data with data stored in knowledge base 24. The operation of the comparison module is illustrated by a flowchart in FIG. 5. By way of example, data received from work area 38, step 110, is first compared with *ATC Handbook* rules and procedures in the general knowledge base for possible violations, steps 111 and 112. The *ATC Handbook* is a government handbook for air traffic controllers which contains rules which apply to every airport facility in the country. These rules may be replaced with rules and procedures for different countries. If it is determined that a rule has been violated, comparison module 22 causes the simulated radar screen to display an alert message and an explanation of the alert in the instructor's window, steps 114 and 116. Other violations, such as minimum safe altitude warnings and aircraft performance characteristics, are also checked and processed by the expert system before checking for violations in the site-specific knowledge base, steps 118 and 120. Violations in the site-specific knowledge base such as site-specific letters-of-agreement violations, standard operating procedure violations, etc., are similarly checked and processed by the expert system before more data is retrieved from the work area, steps 121-125. Even if there are no rules or procedures violated, expert operating procedures for that scenario are compared to take advantage of a heuristic approach for teaching the user. If the user's command exhibits a poor technique, a guidance message will be issued via the instructor's window 42, step 116.

Figure 6:
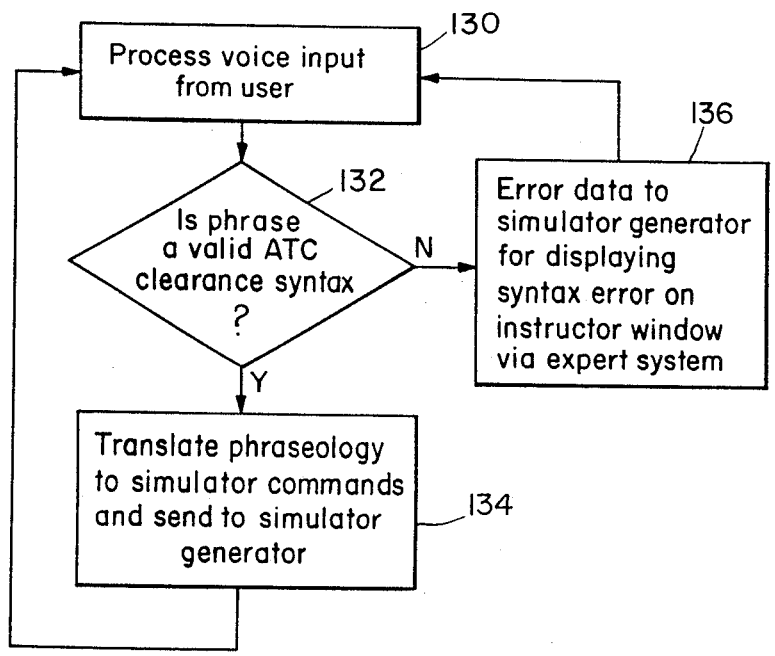
FIG. 6 is a flow diagram illustrating the operation of a voice-recognition pseudopilot.

In another embodiment, data are entered into the simulator generator by a pseudopilot that consists of a voice recognition system which translates the voice of the user controller into digitized signals that are recognized by simulation generator 34 as command instructions. A flowchart providing an example for such a system is illustrated in FIG. 6. Referring to the flowchart, the voice recognition system processes the user's verbal commands, step 130, which are in terms of air traffic control clearance phrases recognized by the industry. The system first tests to see if the phrase is a valid phrase, step 132. If the phrase has been worded incorrectly, an error message is sent to comparison module 22 via the simulation generator 34 for displaying the error in the instructor's window 42, step 136. Alternatively, the user can be alerted by way of the voice synthesizer. The pseudopilot voice-recognition system then waits for the next input from the user, step 130. For a valid air traffic control clearance command, the voice-recognition system translates the phraseology into proper control signals for updating the simulation generator 34 and the work area 38, step 134.

In an alternative embodiment, the pseudopilot is equipped with a touch-sensitive screen which allows a person acting as a pseudopilot to quickly update the scenario. This allows the pseudopilot to handle more complex air traffic situations without requiring the assistance of a second pseudopilot.

Figure 7:
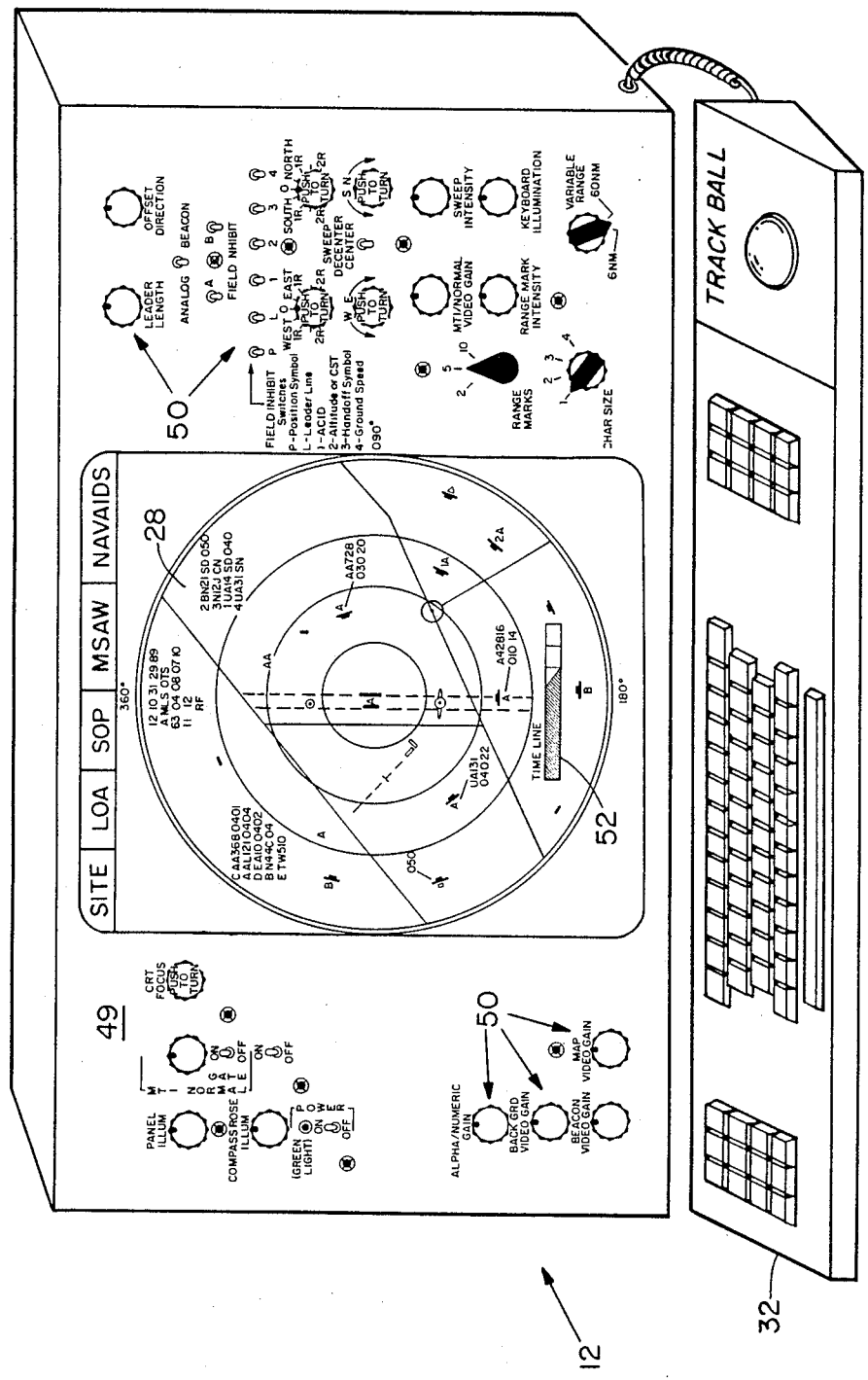
FIG. 7 is a front perspective view of the training unit showing a control panel and instrumentation.

As shown in FIG. 7, the entire workstation of an air traffic controller is simulated. In addition to display screen 28, training unit 12 includes a control panel 49. Panel 49 may be controlled by a standard microcomputer such as an IBM Personal Computer for allowing the user to control the knobs and levers 50 associated with the simulated radar display for simulating the real environment of the air traffic control station. For example, one knob may be used for controlling the intensity of the screen. Other knobs may be used for increasing or decreasing the area displayed by the radar simulator or offset direction. The control panel, together with the graphic display screen, can be arranged to simulate any air traffic control workstation that is currently being used.

Training unit 12 also includes a time line 52 on the radar simulator, indexing the scenario as it develops. Time line 52 serves as a marker so that if a user or instructor wishes to view the consequences of a user's clearance command, a future point can be referenced for accelerating the scenario. In addition, time line 52 can serve as a marker for replaying a portion of the scenario.

Figure 8:
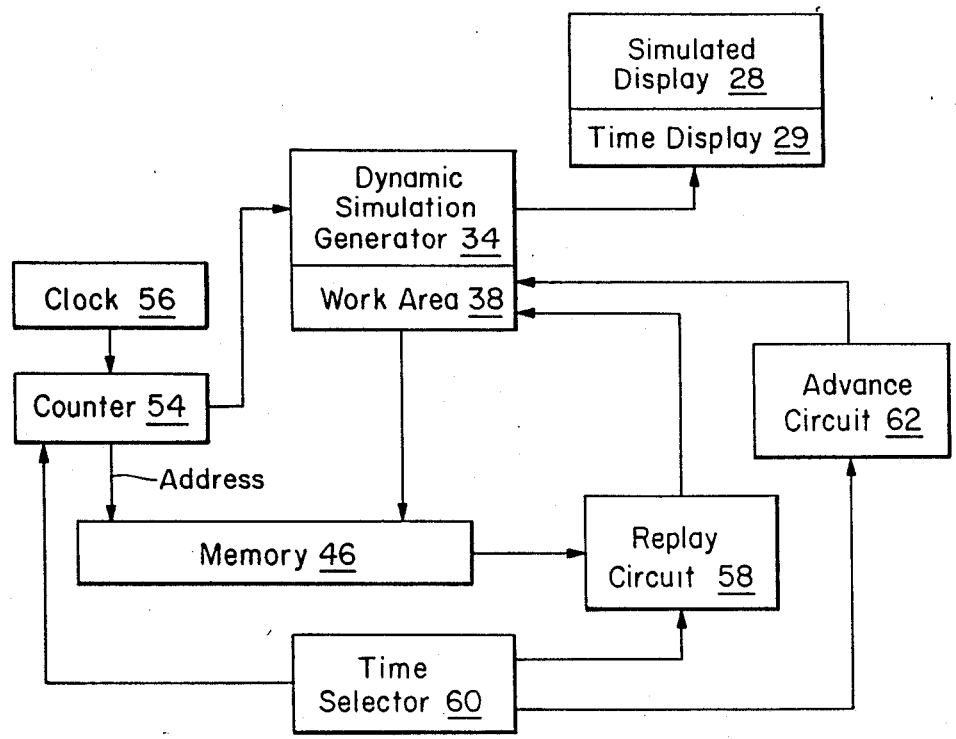
FIG. 8 is a schematic block diagram illustrating the operation of a time line for replaying or advancing the scenario.

The time indicated on time line 52 is generated by a counter 54, FIG. 8, which is driven by a clocking device 56 such as a crystal. The count generated by counter 54 is used by simulation generator 34 for displaying time on an inset on simulated radar display 28. The count of the counter is stored in memory 46 together with data in work area 38 for indexing the scenario in memory as it is recorded. When the user or instructor selects to replay the scenario, a replay circuit 58 is enabled by a time selector 60. The time selector 60 may be controlled by the user's terminal 32. The scenario is replayed by resetting the count o the counter which addresses the memory for selectively feeding back into the work area the stored scenario corresponding to the count on the counter. The recorded scenario is then displayed via dynamic simulator generator 34. Time selector 60 also resets the time displayed on simulated display 28.

If the user or instructor selects to advance the circuit, time selector 60 advances counter 50 and enables advance circuit 62. Advance circuit 62 causes work area 38 to advance the scenario to some predetermined period of time by using the current data for each aircraft in the work area to determine each aircraft's future position. This advance scenario is then displayed on simulated radar screen 28 via dynamic simulator generator 34.

Figure 8B:
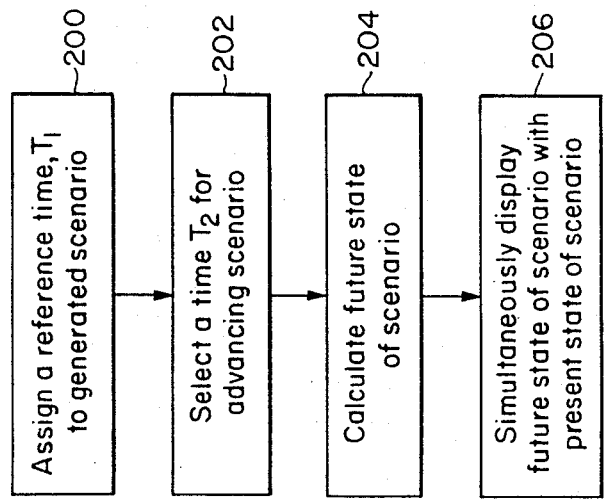
FIG. 8B is a flow diagram illustrating the operation of generating the scenario of a different, preselected period of time.
Figure 8A:
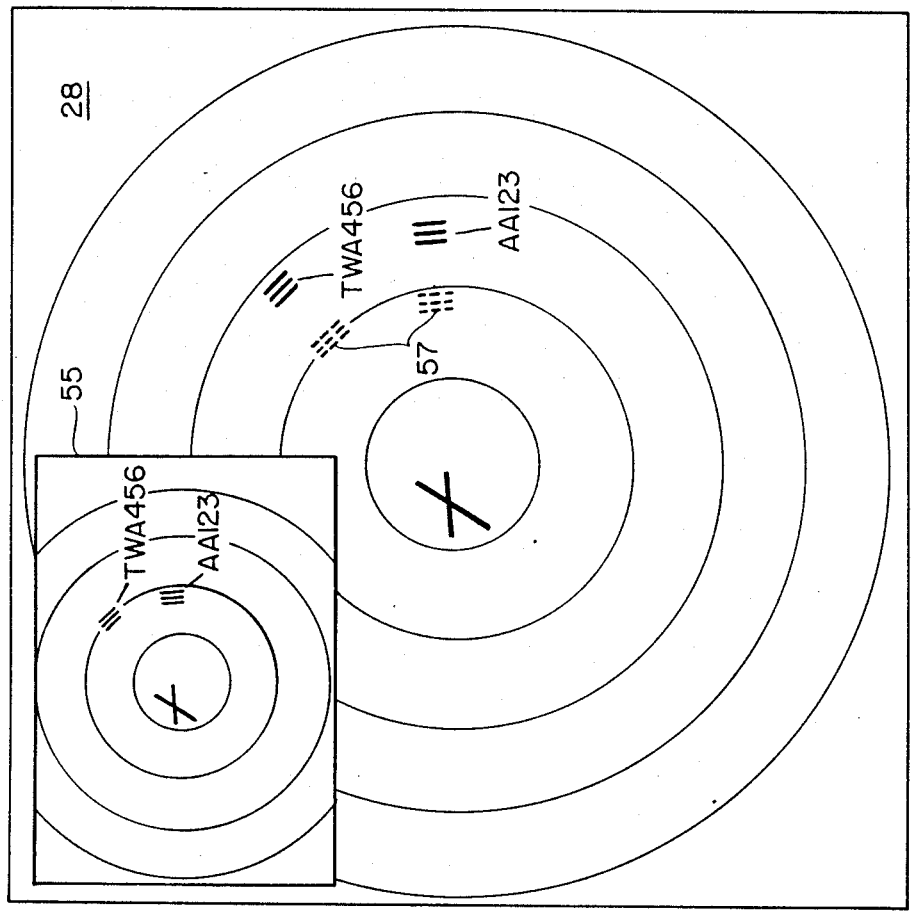
FIG. 8A is an illustration of a radar screen showing the flight pattern of two aircraft at a particular airport terminal and an inset on that screen for showing that flight pattern at a different preselected interval of time.

In an alternate embodiment, future effects of a user's clearance can be constantly monitored by a smaller radar display 55 inset on display 28, as shown in FIG. 8A. Display 55 is used to show the positions of the aircraft during the scenario at a preselected instant in time. These positions are determined by assigning a clock indicating a reference time T1 to the scenario generated on display 28, as illustrated by block 200 of FIG. 8B. A period of time T2, such as +3 minutes, is then selected to advance the generated scenario to a future state of the scenario, block 202. The future state of the scenario is then calculated using the current heading and speed of each aircraft in the scenario and generated on display 55, blocks 204 and 206. Display 55 may also be used to look at a previous condition or to freeze the scenario at a predetermined interval of time. Preferably this inset is generated and controlled by the dynamic simulator generator 34 and mapping generator 43 of inference engine 37, FIG. 2.

Alternately, ghost target images 57 (shown in phantom) for each aircraft can be selectively introduced onto display 28 to indicate the future position of the aircraft. Ghost target images 57 are also based on the aircraft's current heading and speed at some preselected future time. In some cases a particular color can be assigned to ghost target images 57 for systems that employ a color monitor to display the scenario.

Figure 8C:
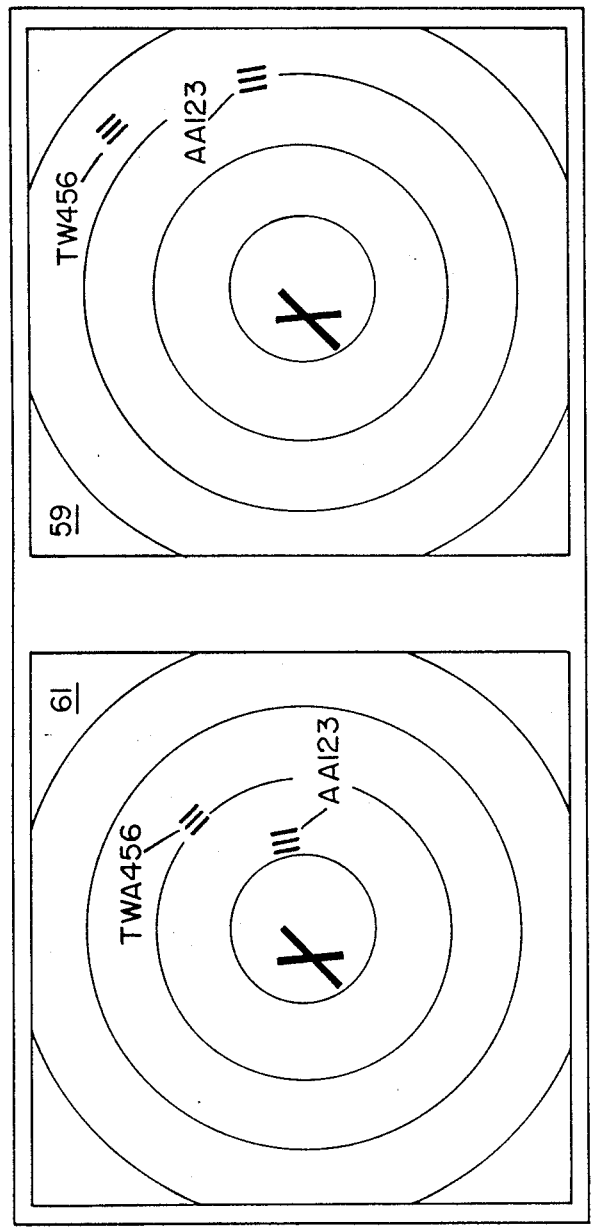
FIG. 8C is an illustration of two adjacent radar screens of the training system for simultaneously displaying a scenario at different intervals of time.

In another embodiment, the system includes two radar displays as shown in FIG. 8C. One radar display 59 is used for displaying the current aircraft's position. The other radar display 61 is used for indicating some future position of the aircraft based on current headings and speeds.

User 16 may select a particular site to be shown on display 28 by choosing the desired site from a list, not shown, when the menu labeled "site", FIG. 7, is selected by a cursor. The list of sites may include airports such as Boston, New York, Washington, or enroute sites. A list for selecting a scenario to be generated for that particular site may also be chosen at that time. The scenario may be a programmed scenario for that particular site or a scenario that can be superimposed on any site. When a site is selected, the geographic boundaries for that particular site are displayed on simulated radar display 28 and the scenario commences. Navigational markers, such as visual omnirange locations, are also displayed. In other words, characteristics that are particular for each site are generated by the system using software rather than slides or film which has been specially engraved for that particular site.

Figure 9:
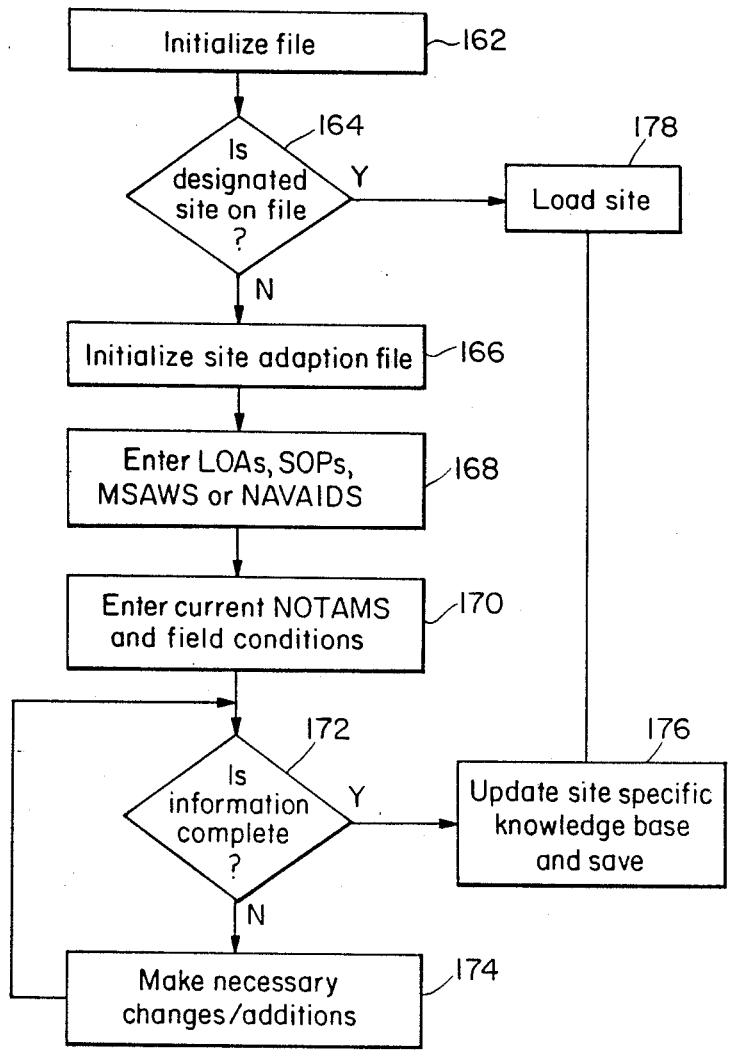
FIG. 9 is a flow diagram illustrating the operation of changing the specifics at a particular site.

Generating sites using software also has the advantage of updating or modifying a particular site by initializing a site-adaption file, steps 164 and 166, as illustrated in the flow diagram in FIG. 9. A new file for creating a new site may also be created. Once the site adaption system is initialized, the site-specific knowledge base for a particular site as well as current NOTAMs and field conditions, steps 168 and 172, are loaded into the initialized file. After the necessary changes and additions have been made, the updated site-specific knowledge base is saved and that particular site is displayed on the simulated radar screen, steps 172, 174, 176, and 178. New files may alternately be loaded into the knowledge base.

Figure 10:
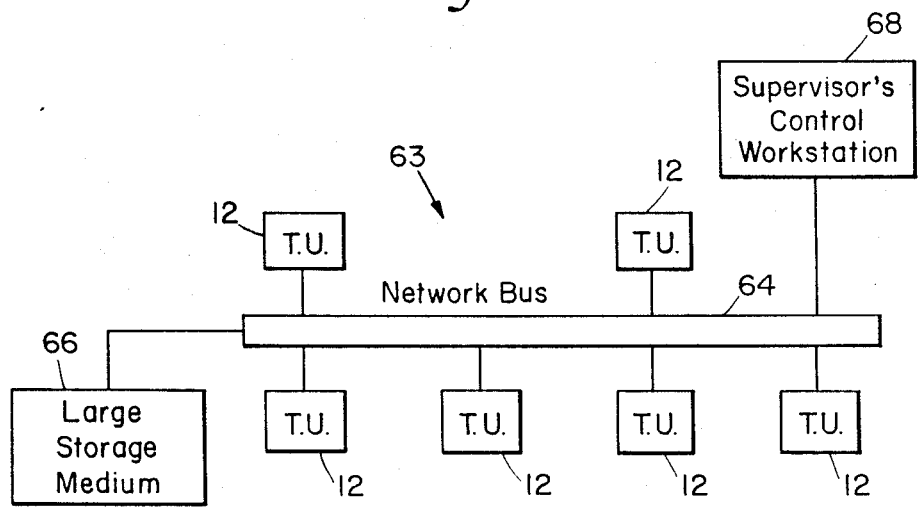
FIG. 10 is a schematic block diagram of a network of training units.

In another embodiment, the air traffic training system is expanded to a network 63 which includes a plurality of training units 12, as shown in FIG. 10. Training units 12 are connected together by a broadband network bus 64 such as Ethernet or other network system. This network allows voice, video, and computer data to pass over bus 64. In this embodiment, the expert system and the knowledge base can be stored on a large storage medium 66 such as an optical Write Once Read Many (WORM). This storage medium may also be used to store the library of scenarios for each site selected, as well as the complete history of each training session for each user. With such a network, each user can learn the valuable lesson of teamwork by learning to hand off control of aircraft in their control sector to other users controlling different sectors. In other words, network 63 can simulate the whole air traffic control system with each training unit simulating a geographical section of the network. Thus, the system gives the ability to provide different levels of terminal control as would be seen in a normal controller environment. For example, the network may include a departure terminal, arrival terminal, and en route control stations. Other valuable lessons, such as simultaneously training air traffic controllers rules and procedures for different sites, are also possible. This feature is particularly useful when air traffic controllers are reassigned or transferred to another site.

Network system 63 also includes a supervisor's control workstation 68. Supervisor's control workstation 68 is similarly connected to other user training units 12 over network bus 64. In the preferred embodiment, supervisor's control workstation 68 is similar to training unit 12, except that it can monitor or change the scenario displayed by any of the training units. In other words, supervisor's control workstation 68 can selectively change the environments or scenarios of any or all of the training units 12. Workstation 68 can also update the NOTAMs, as well as request all of the alerts that have been issued by any of the individual training units or replay any of the scenarios.

Figure 11:
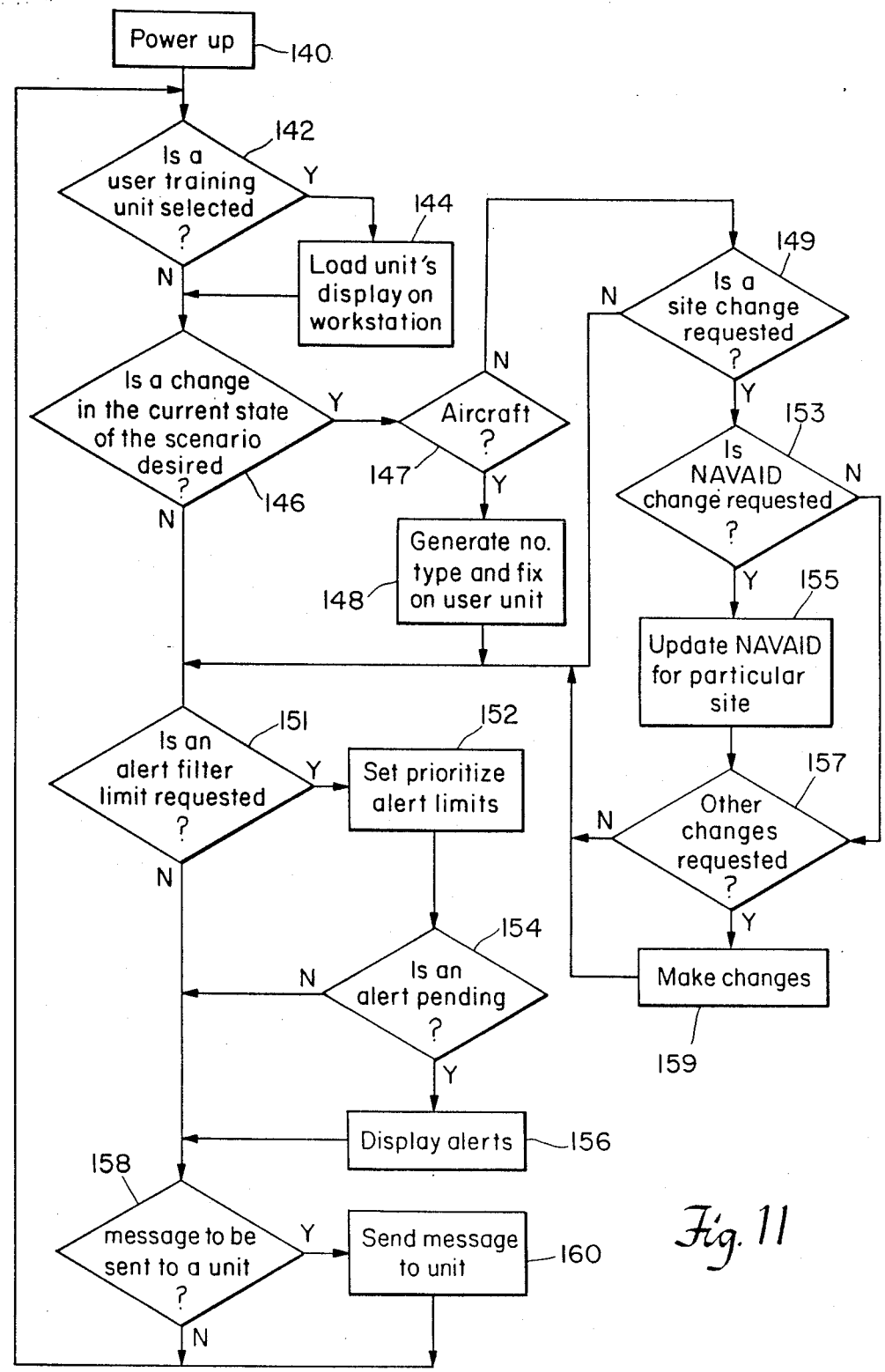
FIG. 11 is a flow diagram illustrating the operation of the instructor control workstation shown in FIG. 10.

A flowchart illustrating the operations of an instructor control workstation is shown in FIG. 11. After being powered up, step 140, the workstation determines if an instructor has requested to monitor a particular training unit 12, step 142. The scenario displayed on that unit is then displayed by tying into that unit's dynamic simulation generator via network bus 64, step 144. The workstation 68 then looks to see if a scenario change for a particular site is desired by the operator, step 146; for example, introducing additional aircraft or environmental changes such as weather conditions, runway conditions, etc., steps 147–149, 153, 155, 157, and 159. Aircraft changes are made by sending the proper commands to that unit's dynamic simulation generator, step 148. Environmental changes are made by updating the NOTAM for that particular site, steps 157 and 159. NAVAIDS for a particular site may also be updated, steps 153 and 155. Workstation 68 also determines if the operator has requested alert messages that have been issued by one or more units, step 151. The workstation may be flagged as alerts occur at the individual training units. These alerts are prioritized, step 152, and then displayed on the simulated radar screen of the workstation, steps 154 and 156, indicating which units had issued the alerts. Supervisor's workstation 68 may then determine if the operator wishes to send a message to one or all of training units 12, steps 158 and 160. Other tasks may also be performed by workstation 68, such as recalling and replaying a stored training session or updating the library of stored scenarios.

An air traffic control training system according to this invention can provide great versatility. For example, the scenario library may store two types of training exercises for each site selected: one for teaching the user approach control; the other, departure control. If the user is being trained for departure, then approaching aircraft will properly land itself without instructions from the user. Alternately, for training a user for approaches, all departures will leave according to the proper order or sequences. The user controller must then safely maneuver around the departures to land the aircraft. In this type of scenario the departure may leave the runway, climb to a standard altitude, and from there the user controls its flight pattern.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A site-selectable traffic control training system for interacting with a user, comprising:
   means for generating a representation of at least one moving vehicle having an initial position and heading for producing a dynamic simulation of a traffic scenario at one of a plurality of selectable sites;
   means for entering a controller command from the user for altering the traffic scenario simulation;
   a general knowledge base for storing common rules and procedures applicable to traffic scenario simulations for said plurality of selectable sites;
   a site-specific knowledge base for storing particular rules and procedures applicable to one or more traffic scenario simulations for each of said plurality of selectable sites; and
   a comparison module for comparing the rules and procedures of said general knowledge base and said site-specific knowledge base to at least one of the present state of the simulation of the traffic scenario and the controller command and for issuing an alert upon the immediate or forseeable failure of the user to observe any rule or procedure in said knowledge bases.

2. The system of claim 1 in which said means for generating includes simulated display means for displaying the dynamic simulation of the traffic scenario and geographic boundaries associated with the selected site.

3. The system of claim 1 in which said site-specific knowledge base includes a record of the performance of an expert traffic controller for the traffic scenario simulation and said comparison module compares the record for generating instructions to the user.

4. The system of claim 1 in which said means for generating includes:
   means for displaying the dynamic simulation of the traffic scenario; and
   control panel means and instrumentation means for enabling control by the user of said means for displaying and for simulating the controls present in the work environment of a traffic controller.

5. The system of claim 1 in which said means for generating includes:
   means, responsive to said site-specific knowledge base, for displaying geographical boundaries associated with the selected site;
   means for displaying the traffic scenario simulation;
   means for establishing an inset on said means for displaying;
   clock means for generating time increments to index the generated traffic scenario simulation; and
   means for representing the generated time increments within the inset on said means for displaying.

6. The system of claim 5 further including:
   storage means, responsive to said clock means, for storing the traffic scenario the simulation; and
   means for addressing a selected time increment to replay the simulation on said means for displaying.

7. The system of claim 5 in which said clock means includes means for advancing the traffic scenario simulation to a predetermined increment of time.

8. The system of claim 1 in which said means for generating includes means for generating and displaying navigational aids associated with said one of a plurality of selectable sites.

9. The system of claim 1 in which said means for generating includes simulator means for displaying the traffic scenario simulation and means for simultaneously generating and displaying the traffic scenario simulation at a different predetermined increment of time.

10. The system of claim 9 in which said means for simultaneously generating and displaying further including means for generating an inset on said simulator means for displaying simultaneously the traffic scenario simulation at the different predetermined increment of time.

11. The system of claim 9 in which said means for simultaneously generating and displaying further including means for generating ghost target images on said simulator means.

12. A site-selectable traffic control training system for interacting with at least one user, comprising:
    at least one training unit including:
       simulated display means;
       mapping means for generating geographical boundaries and navigational aids for each of a plurality of selectable sites and for displaying said boundaries and said aids of a selected site on said display means;
       means for generating and displaying on said display means a representation of at least one moving vehicle having an initial position and heading for producing a dynamic simulation of a selected traffic scenario; and
       means for entering a controller command from the user for altering the traffic scenario simulation;
    a general knowledge base for storing common rules and procedures applicable to traffic scenarios for said plurality of sites;
    a site-specific knowledge base for storing particular rules and procedures applicable to one or more traffic scenario simulations for each of said selectable sites; and
    a comparison module for comparing the rules and procedures of said knowledge bases to at least one of the present state of the simulation of the traffic scenario and the controller command and for issuing an alert upon the immediate or forseeable failure of the user to observe any rule or procedure.

13. The system of claim 12 further including:
    a network bus for interconnecting a plurality of said training units; and
    a supervisor unit interconnected to said plurality of training units over said network bus, said supervisor unit including means for selectively displaying the traffic scenario simulation selected at each of said plurality of training units.

14. The system of claim 13 further including means for entering a supervisor command for altering the traffic scenario simulation displayed on said means for displaying at one or more of said plurality of training units.

15. The system of claim 13 in which said site-specific knowledge base includes notices, and said supervisor unit includes means for generating and updating said notices in each of said plurality of training units.

16. The system of claim 13 in which said means for generating includes:
   means for generating an inset on said means for displaying;
   clock means for generating time increments to index the generated traffic scenario simulation; and
   means for representing the generated measurements of time within the inset on said means for displaying.

17. The system of claim 16 further including:
   storage means responsive to said clock means for storing the traffic scenario simulation time increments; and
   means for addressing a selected time increment to replay the simulation on said means for displaying.

18. The system of claim 12 in which said means for generating includes control panel means and instrumentation means for enabling control of said display by the user and for simulating the controls present in the work environment of a traffic controller.

19. The system of claim 12 in which said means for entering includes pseudopilot means interconnected to said means for generating for responding to verbal commands issued by the user to alter the traffic scenario simulation.

20. A selectable site traffic control training system for interacting with a user, comprising:
   means for selecting a particular site from a plurality of sites;
   means for generating a representation of at least one moving vehicle having an initial position and heading for producing a dynamic simulation of a selected traffic scenario associated with the particular site selected;
   means for displaying said dynamic simulation of the traffic scenario;
   mapping means for generating and displaying geographical boundaries associated with the particular site selected;
   means for entering a controller command from the user for altering the traffic scenario simulations; and
   means for verbally acknowledging controller commands in response to said means for entering a controller command from the user;
   a general knowledge base for storing common rules and procedures applicable to a traffic scenario simulation for all of said plurality of sites;
   a site-specific knowledge base for storing particular rules and procedures applicable to a traffic scenario simulation for each site selected; and
   a comparison module for comparing the rules and procedures of said knowledge bases to at least one of the present state of the simulation of the traffic scenario and the controller command and for issuing a warning upon the immediate or foreseeable failure of the user to observe any rule or procedure in the knowledge bases.

21. The system of claim 20 in which the training unit includes control panel means and instrumentation means for enabling control of said means for displaying by the user and for simulating the controls present in the work environment of a traffic controller.

22. The system of claim 20 in which said training unit includes means for generating and displaying navigational markers.

23. A traffic control training system for simulating a selected site and interacting with a user, comprising:
   means for generating a representation of at least one moving vehicle having an initial position and heading for producing a dynamic simulation of a traffic scenario;
   means for entering a controller command from the user for altering the traffic scenario simulation;
   a general knowledge base for storing common rules and procedures applicable to traffic scenario simulations;
   a site-specific knowledge base for storing particular rules and procedures applicable to said traffic scenario simulations for said selected site; and
   a comparison module for comparing the rules and procedures of said general knowledge base and said site-specific knowledge base to at least one of the present state of the simulation of the traffic scenario and the controller command and for issuing an alert upon the immediate or forseeable failure of the user to observe any rule or procedure in said knowledge bases.

24. A method for training traffic controllers on a site-selectable traffic control training system for interacting with a user, comprising:
   selecting a particular site from a plurality of sites;
   generating a map of the selected site on a simulated display means;
   generating a representation of at least one moving vehicle having an initial position and heading for producing a dynamic simulation of a traffic scenario on the display means;
   entering a controller command from the user for altering the traffic scenario simulation;
   providing a general knowledge base for storing common rules and procedures applicable to traffic scenario simulations generated by said means for generating for said plurality of sites;
   providing a site-specific knowledge base for storing particular rules and procedures applicable to a traffic scenario simulation for the selected site;
   comparing the rules and procedures of the knowledge bases to at least one of the present state of the simulation of the traffic scenario simulation and the controller command; and
   issuing a warning upon the immediate or forseeable failure of the user to observe any rule or procedure in the knowledge bases.

25. The method of claim 24 in which generating further includes:
   establishing an inset on the simulated display means;
   creating time increments to index the generated traffic scenario; and
   representing the time increments within the inset of the simulated display means.

26. The method of claim 24 further including:
   storing the traffic scenario simulation as indexed by the time increments; and
   addressing a selected time increment to replay the simulation on the simulated display means.

* * * * *